United States Patent [19]

Huang

[11] Patent Number: 4,853,238

[45] Date of Patent: Aug. 1, 1989

[54] METHOD OF TREATING LIQUID EGG AND EGG WHITE WITH MICROWAVE ENERGY TO INCREASE REFRIGERATED SHELF LIFE

[75] Inventor: Frank Huang, Worthington, Ohio

[73] Assignee: Worthington Foods, Inc., Worthington, Ohio

[21] Appl. No.: 222,658

[22] Filed: Jul. 21, 1988

[51] Int. Cl.⁴ .................................................. A23B 5/00
[52] U.S. Cl. ...................................... 426/241; 426/521
[58] Field of Search ............ 426/241, 243, 521, 330.1; 219/10.55 M

[56] References Cited

U.S. PATENT DOCUMENTS 3,843,813  10/1974  Driggs ................................... 426/241

FOREIGN PATENT DOCUMENTS 651774  3/1979  U.S.S.R. ................................ 426/241
1187766  4/1970  United Kingdom ................ 426/241

OTHER PUBLICATIONS

Ball, Jr. et al., Functionality and Microbial Stability of Ultrapasteurized Aseptically Packaged Refrigerated Whole Egg, 1987, p. 1212, published in the Journal of Food Science, vol. 52, No. 5, 1987.

*Primary Examiner*—George Yeung
*Attorney, Agent, or Firm*—John L. Gray

[57] ABSTRACT

A method of treating liquid egg white and liquid whole egg and the produce obtained thereby which comprises subjecting the liquid egg white or the liquid whole egg to microwave energy for a time sufficient to inactivate or destroy a sufficient amount of micro-organism contained therein without significantly reducing the egg protein functionality so as to provide extended shelf life of the egg white or whole egg.

8 Claims, No Drawings

METHOD OF TREATING LIQUID EGG AND EGG WHITE WITH MICROWAVE ENERGY TO INCREASE REFRIGERATED SHELF LIFE

BACKGROUND OF THE INVENTION

Due to the close relationship between high cholesterol intake and the serum cholesterol level in humans (a factor in coronary heart disease), reduction in egg consumption, which is perhaps the largest single food source of cholesterol, has become a commonly accepted dietary measure in order to curb this ailment. Commercially available egg substitutes containing low or no cholesterol are thus becoming increasingly popular. These products are generally made of egg white with or without the yolk. To improve their palatability and stability, flavoring, coloring, emulsifying, thickening, and other modifying agents are generally added. Such products without the yolk are sold either frozen or refrigerated.

In the case of nonfrozen refrigerated products, liquid egg can be subjected to conventional pasteurization or ultra-pasteurization processes to extend its refrigerated shelf life. A typical time/temperature combination used for pasteurizing eggs is 3.5 minutes at 140° F. During ultra-pasteurization processing, combinations of temperatures ranging from 147° F. to a maximum of 162° F. and holding times of 2.7 to 192 seconds have been reported (*Journal of Food Science*, Ball, et al., vol. 52, No. 5, 1987, p. 1212).

Certain protein fractions in egg heat denature at temperatures between 136° F. and 144° F. However, by using conditions of turbulent flow in a conventional heat exchanger, liquid egg can be heated to a maximum of 162° F. with minimum protein denaturation. This is the theoretical foundation for ultra-pasteurization technology of eggs.

In the case of egg white, which is the high protein containing component of avian eggs and which is most sensitive to heat denaturation, ultra-pasteurization can only be carried out at temperatures below that used for whole egg. To reach the same processing temperature as whole egg (i.e. 162° F.), added ingredients such as starch, oil, aluminum sulfate, and acid become necessary (see copending U.S. patent application Ser. No.).

SUMMARY OF THE INVENTION

The instant invention involves a process and a product produced thereby for treating egg white or whole egg using microwave radiation. Microwave radiation as used herein is meant any electromagnetic radiation having a wave length in the approximate range of from one millimeter to one meter, the region between infrared and shortwave radio wave lengths. By using this energy source to heat the liquid egg white product, the product can be raised to a temperature of 185° F. without significant thermal gelation. The egg white and egg white-containing products can be thermally processed above temperatures normally considered to be maximum and still remain liquid. The resulting processed egg white product is virtually bacteria-free and has extended shelf life under refrigeration when filled under aseptic conditions and packaged in extended shelf life containers.

It is therefore an object of this invention to process liquid egg products to a temperature of 185° F. without significant thermal gelation.

It is also an object of this invention to process such liquid egg products at this temperature and thus cause them to be virtually bacteria-free.

It is a still further object of this invention to obtain such a treated egg product which will have extended shelf life under refrigeration when filled under aseptic conditions and packaged in extended shelf life containers.

These, together with other objects and advantages of the invention will become more readily apparent to those skilled in the art from the following general statements and descriptions.

DETAILED DESCRIPTION OF THE INVENTION

During ultra-pasteurization processing, as described in Ball, et al., supra, and applicant's copending patent application, Ser. No. 209,802, it is necessary to achieve a uniform fluid temperature within a brief time period to assured microbial lethality. Thus, sustaining fluid turbulent flow is a critical element during continuous thermal processing using conductive heat in a tube. Turbulent flow also minimizes material burn-on or fouling of the heating tube. Once fouling occurs the processing conditions are invariably altered and the production must be discontinued.

In the instant invention, the internal heat is generated from the molecular friction of the excited water molecules in the fluid being treated due to the bombardment of the electromagnetic radiation. Thus, the dielectric property of the material being treated according to the instant invention determines the internal heat generation, rather than the thermal conductivity of the material which would govern the rate of conductive heat transfer from the heating source throughout the material. Thus, moisture content of the material being treated is particularly important in accordance with the instant invention.

Also important is the radiation penetration depth of the microwave energy source since this sets the limits on the rate and effectiveness of heating, as distinguished from the distance of a particular locality in a material from the heating source as in conductive energy transfer. The size of the heating tube used in the instant invention then must be of a diameter such that it will maintain the material within the effective radiation penetration limit. Also, a turbulent flow to achieve rapid uniform temperature distribution is not necessary. In conductive heating, energy migration from high to low temperature regions is required to eventually reach an equilibrium. Thus, the time required to obtain a uniform energy distribution is considerably greater with conductive heating when compared to microwave applications, and thus turbulent flow becomes a determining factor in the rate of heat distribution.

Microwave energy inactivates micro-organisms through thermal kill. It also has the potential to cause biological damage as well as alteration of the cell membrane and metabolic functions. This injurious effect on the living organisms may very well induce additional lethality and impaired recovery from injuries by them during the subsequent time period of product storage.

In determining the parameters of the instant invention, it is important that the egg's functionality must be maintained as much as possible. A minimum of functional loss is desired in the finished product, thus the kinetics of microbial lethality and protein denaturation of the product provide critical information for optimizing the thermal process of egg products.

In order to establish the kinetics, an egg white-containing mixture was inoculated with Escherichia coli (ATCC #25922) at a concentration of $10^6$ cfu per ml, and subjected to microwave heating to various product temperatures.

The resultant samples were tested to determine bacterial survival and water soluble protein content. An Arrhenius plot of the inactivation rate vs. temperature (1/T) was then constructed. The rate of bacterial kill increased at a greater pace than that of the protein denaturation.

Based upon the study results, it is believed that the advantage of having bacterial killed by increasing the processing temperature outweighs the drawback of losing some protein functionality.

EXAMPLE

A liquid egg white-containing mix is fed at a rate of 26 to 51 liters per hour into a ⅛ inch ID Teflon tubing by means of a positive displacement pump in a processing line. The mixture has a composition of:

| Ingredient | Percent by Weight |
| --- | --- |
| Liquid Egg White | 96.027 |
| Oil Blend | 2.594 |
| Starch | 1.000 |
| Water | 0.275 |
| Vitamins | 0.040 |
| Aluminum Sulfate | 0.034 |
| Natural Flavor | 0.030 |
| Citric Acid (pH adjustment) | — |

The mixture is heated by utilizing a 2KW microwave generator (2450 MHz) up to 185° F. in a coiled tube inside a shielded chamber. Residence time of the product at the desired temperature level is approximately 0.02 seconds. As the heated product exits the heating section, it is rapidly chilled in a heat exchanger to about 50° F. or below prior to aseptic filling into sterile containers.

The resulting product had a minimum functional loss in the finished product with a significantly increased bacterial kill.

While the material may be heated up to 185° F. without significant protein denaturation and maximum bacterial kill, satisfactory results have been obtained in the temperature range of 167° F. to 176° F.

While this invention has been described solely in conjunction with microwave heating of egg white products, it should be borne in mind that this invention may be used in combination with other conventional heating methods to achieve economical and/or functional benefits.

While this invention has been described in its preferred embodiment, it is to be appreciated that variations therefrom may be made without departing from the true scope and spirit of the invention.

What is claimed:

1. A method of treating a liquid egg material selected from the group consisting of liquid egg white and liquid whole egg after having been removed from the egg shell, which comprises subjecting said liquid egg material to continuous microwave energy while said liquid egg material is flowing though a conduit for a time sufficient to inactivate or destroy a sufficient amount of micro-organisms contained in said liquid egg material without significantly reducing the egg protein functionality of said liquid egg material so as to permit extended shelf life of said liquid egg material, whereby said liquid egg material is capable of being heated to a temperature above approximately 162° F.

2. The method of claim 1 wherein said liquid egg material is subjected to microwave energy for a time sufficient to raise its temperature to 185° F.

3. The method of claim 1 wherein said liquid egg material is subjected to microwave energy for a time sufficient to raise its temperature to between 167° F. and 176° F.

4. The method of claim 2 wherein said liquid egg material is rapidly cooled to about 50° F., or below, immediately after having been heated to 185° F., and thereafter said liquid egg material is aseptically filled into sterile containers.

5. The method of claim 1 wherein the diameter of said conduit does not exceed the radiant penetration depth of the source of microwave energy.

6. The method of claim 1 wherein said liquid egg material has been immediately cooled to a temperature of from 25° F. to 40° F. following heating.

7. The method of claim 2 wherein said liquid egg material has been immediately cooled to a temperature of from 25° F. to 40° F. following heating.

8. The method of claim 3 wherein said liquid egg material has been rapidly cooled to a temperature of about 50° F. or below immediately after having been heated to a temperature of between 167° F. to 176° F.

* * * * *